June 3, 1941.　　　D. F. FOX　　　2,243,949
REFRIGERATING CIRCUIT PURIFIER
Filed Sept. 7, 1939
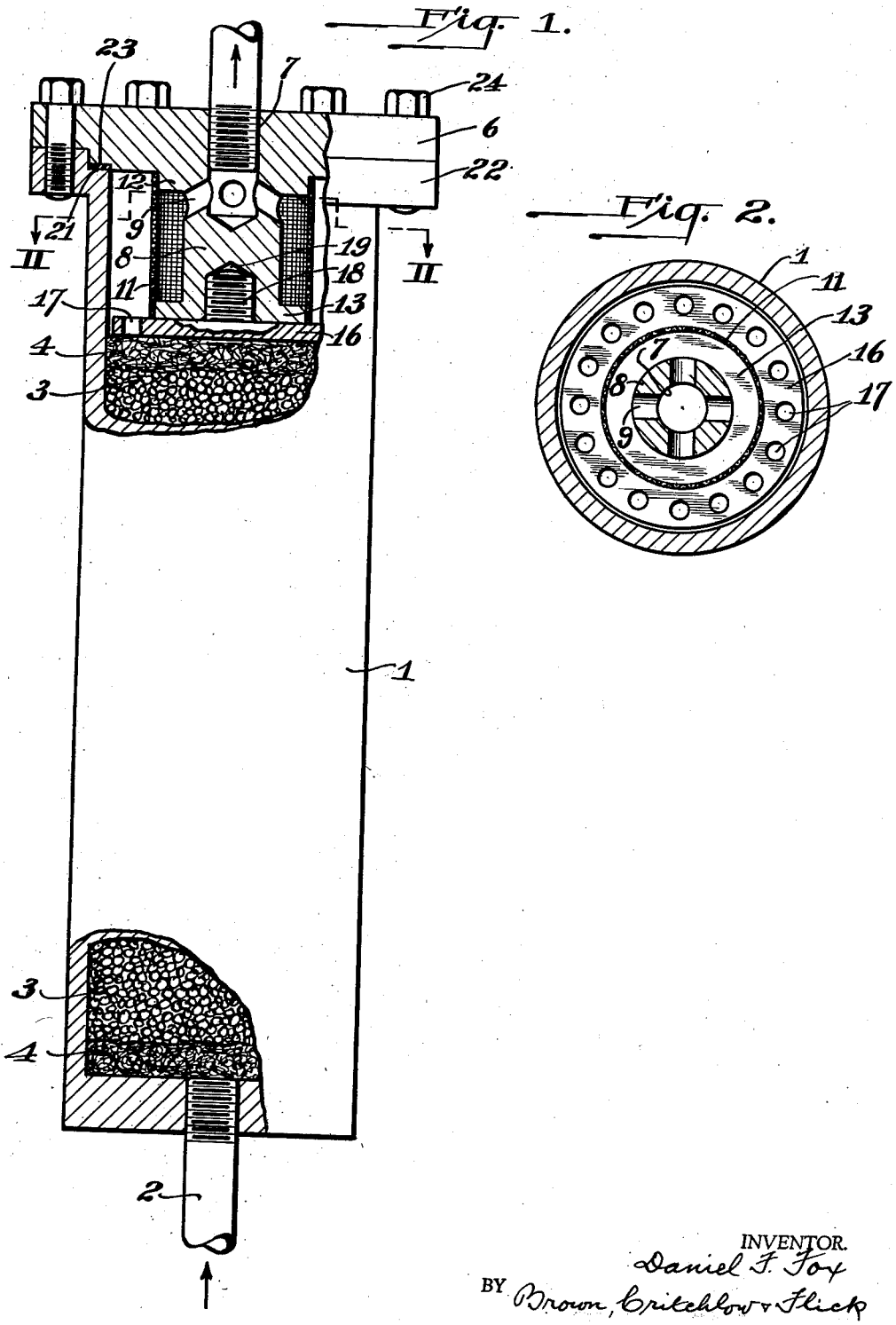
INVENTOR.
Daniel F. Fox
BY Brown, Critchlow & Flick
his ATTORNEYS.

Patented June 3, 1941

2,243,949

UNITED STATES PATENT OFFICE 2,243,949

REFRIGERATING CIRCUIT PURIFIER

Daniel F. Fox, McKeesport, Pa.

Application September 7, 1939, Serial No. 293,739

9 Claims. (Cl. 210—131)

This invention relates to purifying apparatus for fluid systems, and more particularly to dehydrating and filtering apparatus for the fluid circuits of mechanical refrigerating systems.

It is well known that water and particles of foreign matter are highly undesirable in the refrigerating fluid of a mechanical refrigerating system. The foreign particles are apt to clog the system, while the water may do the same thing by freezing in the cold parts of the system. Although all possible precautions are taken to prevent moisture from entering the circuit when the refrigerator is manufactured and whenever the fluid circuit has to be opened for repair, it has generally been found necessary to provide the system with means for absorbing the water and filtering out the foreign particles that seem inevitably to be found in such a system. However, such purifying apparatus known heretofore has among other disadvantages the fact that it in itself tends to clog the fluid circuit.

It is among the objects of this invention to provide a purifier for the fluid circuit of a refrigerating system in which the filtering medium is not clogged by the dehydrating material, in which the filtering and dehydrating mediums may easily be removed and replaced, and in which the filtering medium may be inserted in the purifier without danger of injuring the filter.

In accordance with this invention a receptacle which is adapted to be partly filled with a dehydrating material is provided at one end with an inlet and at its opposite end with an opening. A closure for this opening is provided with an outlet passage. Between the inner end of this passage and the dehydrating material there is a screen for filtering out foreign particles. The dehydrating material is prevented from coming in contact with the screen and clogging its openings by means of a retaining member secured to the closure member. Preferably, the retaining member is detachably connected to the closure and also serves to hold the screen in place. The closure is bolted onto the receptacle so that it does not have to be screwed into it, which might unduly disturb the dehydrating material.

The preferred embodiment of the invention is illustrated in the accompanying drawing in which Fig. 1 is a side view of my purifier partly in section; and Fig. 2 is a horizontal section taken on the line II—II of Fig. 1.

Referring to the drawing, a cylindrical receptacle 1 is provided at its lower end with an inlet to which a conduit 2 of the fluid circuit of a mechanical refrigerating system is connected. The upper end of the receptacle itself is open so that a supply of any suitable dehydrating material 3, such as calcium chloride, may be placed in the receptacle. To aid in holding the dehydrating material in place it is preferably placed between layers of steel wool 4 or the like. The open upper end of the receptacle is normally closed by a closure member 6 provided with a central outlet opening 7. Projecting inwardly from the center of this closure is an integral extension or spacing member 8 provided with a plurality of radial passages 9 that communicate with the inner end of the outlet opening. To remove particles of foreign matter from the refrigerating fluid before they can enter the outlet passages and recirculate through the system, the inner ends of the passages are separated from the dehydrating material by a filter screen 11. This screen is in the form of a cylinder and is supported and closed at its upper end by an annular shoulder 12 on the closure and at its lower end by an annular flange 13 at the inner end of the spacing member. The body of the screen is spaced from the spacing member so that the refrigerating fluid may pass through the screen throughout its area and still reach the outlet passages.

It is a feature of this invention that the body of dehydrating material is prevented from coming in contact with the screen and thereby materially restricting flow through it. Accordingly, a retaining member 16 is detachably connected to the inner end of the spacing member for keeping the dehydrating material out of the space around the screen. This retaining member is preferably in the form of a rigid disc provided between the screen and the receptacle wall with perforations 17 through which the refrigerating fluid flows in order to reach and pass through the screen to the outlet passages. The central portion of the retaining member is provided with a threaded stud 18 that screws into an opening 19 in the inner end of the spacing member. When the closure is removed from the receptacle for cleaning or replacing the screen and for changing the dehydrating material it carries with it the screen and retaining member. The latter detachably locks the screen in place.

To provide a seal between the closure and receptacle the latter is provided with an annular interior recess 21 surrounded by a radial flange 22. The closure projects into this recess and also extends outwardly across the flange. A gasket 23 is mounted in the recess and is clamped between the closure and receptacle by means of bolts 24 that extend through the closure and are threaded in receptacle flange 22. The closure and associated members can thus be removed from the receptacle without turning them as would be necessary if they were screwed into the end of the receptacle. Consequently, the retaining member does not slide on the steel wool or dehydrating material and cause it to work up into perforations 17.

A dehydrating and filtering device constructed in accordance with this invention is especially effective in operation because the body of dehydrating material cannot cover the screen and impede the flow of refrigerating fluid therethrough. As all of the parts are connected to the removable closure, they are all removed and replaced as a unit with the closure. They are also readily removable for the replacement of dehydrating material and the cleaning or replacement of the screen.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A purifier for the fluid circuit of a mechanical refrigerating system, comprising a receptacle adapted to be partly filled with a dehydrating material and provided at one end with an inlet and at its opposite end with an opening, a closure for said opening provided with an outlet passage, a screen disposed between the inner end of said passage and the dehydrating material, and a rigid perforated disc-like retaining member secured at its center to said closure for holding said material away from the screen.

2. A purifier for the fluid circuit of a mechanical refrigerating system, comprising a receptacle adapted to be partly filled with a dehydrating material and provided at one end with an inlet and at its opposite end with an opening, a closure for said opening provided with an outlet passage, a retaining member spaced inwardly from said closure and forming a space between them from which the dehydrating material is excluded, the inner end of said passage opening into said space, a tubular screen extending from said closure to the retaining member and surrounding the inner end of the passage, and means extending axially through the screen for connecting said retaining member to said closure.

3. A purifier for the fluid circuit of a mechanical refrigerating system, comprising a receptacle adapted to be partly filled with a dehydrating material and provided at one end with an inlet and at its opposite end with an opening, a closure for said opening provided with an outlet passage, a spacing member projecting inwardly from the inner face of said closure, the inner end of said passage being disposed at the periphery of said member, a screen surrounding said member, and a retaining member at the inner end of the spacing member for holding the dehydrating material away from the screen.

4. A purifier for the fluid circuit of a mechanical refrigerating system, comprising a receptacle adapted to be partly filled with a dehydrating material and provided at one end with an inlet and at its opposite end with an opening, a closure for said opening provided with an outlet passage, a spacing member projecting inwardly from the inner face of said closure, the inner end of said passage being disposed at the periphery of said member, a screen surrounding said member, and a rigid perforated retaining member detachably connected to the inner end of the spacing member for holding the dehydrating material away from the screen.

5. A purifier for the fluid circuit of a mechanical refrigerating system, comprising a receptacle adapted to be partly filled with a dehydrating material and provided at one end with an inlet and at its opposite end with an opening, a closure for said opening provided with a central opening, a spacing member integral with said closure and projecting inwardly from the center thereof, said member being provided with a radial opening communicating with said central opening, a retaining member connected to the inner end of said spacing member for maintaining the dehydrating material out of the space between it and the closure, and a screen surrounding said spacing member.

6. A purifier for the fluid circuit of a mechanical refrigerating system, comprising a receptacle adapted to be partly filled with a dehydrating material and provided at one end with an inlet and at its opposite end with an opening, a closure for said opening provided with a central opening, a spacing member integral with said closure and projecting inwardly from the center thereof, said member being provided with a radial opening communicating with said central opening, a retaining member threadedly connected to the inner end of said spacing member for maintaining the dehydrating material out of the space between it and the closure, and a screen surrounding said spacing member.

7. A purifier for the fluid circuit of a mechanical refrigerating system, comprising a receptacle adapted to be partly filled with a dehydrating material and provided at one end with an inlet and at its opposite end with an opening, a closure for said opening provided with a central opening, a spacing member integral with said closure and projecting inwardly from the center thereof, said member being provided with a radial opening communicating with said central opening, a retaining member connected to the inner end of said spacing member for maintaining the dehydrating material out of the space between it and the closure, said closure having a shoulder surrounding the outer end of the spacing member and the latter having a flange surrounding its inner end, and a screen surrounding the spacing member and spaced therefrom with its end portions engaging the peripheries of said shoulder and flange.

8. A purifier for the fluid circuit of a mechanical refrigerating system, comprising a receptacle adapted to be partly filled with a dehydrating material and provided at one end with an inlet and being open at its opposite end, a closure for said open end provided with an outlet passage, said closure overlying the end of the receptacle, bolts clamping the closure to the receptacle, a screen disposed between the inner end of said passage and the dehydrating material, and a retaining member secured to said closure for holding said material away from the screen and for engaging the screen for holding it in place.

9. A purifier for the fluid circuit of a mechanical refrigerating system, comprising a receptacle adapted to be partly filled with a dehydrating material and provided at one end with an inlet and being open at its opposite end, a closure for said open end provided with an outlet passage, said open end of the receptacle being surrounded by a radial flange having an interior recess, a gasket in said recess, said closure engaging the gasket in said recess and overlying said flange, bolts clamping the closure to the flange, a screen disposed between the inner end of said passage and the dehydrating material, and a retaining member secured to said closure for holding said material away from the screen.

DANIEL F. FOX.